US010273899B2

(12) United States Patent
Grasreiner (10) Patent No.: US 10,273,899 B2
(45) Date of Patent: Apr. 30, 2019

(54) METHOD FOR RECOGNIZING A DEFECTIVE AIR FLOW SENSOR OF AN INTERNAL COMBUSTION ENGINE

(71) Applicant: Bayerische Motoren Werke Aktiengesellschaft, Munich (DE)

(72) Inventor: Sebastian Grasreiner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 26 days.

(21) Appl. No.: 15/228,637

(22) Filed: Aug. 4, 2016

(65) Prior Publication Data

US 2017/0002764 A1 Jan. 5, 2017

Related U.S. Application Data

(63) Continuation of application No. PCT/EP2015/050919, filed on Jan. 20, 2015.

(30) Foreign Application Priority Data

Feb. 13, 2014 (DE) .................. 10 2014 202 668

(51) Int. Cl.
| | |
|---|---|
| *F02D 41/22* | (2006.01) |
| *F02D 41/18* | (2006.01) |
| *F02D 41/00* | (2006.01) |
| *G01F 25/00* | (2006.01) |
| *G01F 1/68* | (2006.01) |

(Continued)

(52) U.S. Cl.
CPC ....... *F02D 41/222* (2013.01); *F02D 41/0052* (2013.01); *F02D 41/144* (2013.01);
(Continued)

(58) Field of Classification Search
CPC ...... F02D 41/222; F02D 41/187; F02D 41/30; F02D 41/1454; F02D 41/1443;
(Continued)

(56) References Cited

U.S. PATENT DOCUMENTS 6,032,644 A 3/2000 Bederna et al.
6,952,640 B2 * 10/2005 Bleile .................... F02D 37/02
701/108

(Continued)

FOREIGN PATENT DOCUMENTS

CN 101251052 B 4/2012
DE 100 54 199 A1 5/2002
(Continued)

OTHER PUBLICATIONS

International Search Report (PCT/ISA/210) issued in PCT Application No. PCT/EP2015/050919 dated Apr. 2, 2015, with English translation (six (6) pages).

(Continued)

*Primary Examiner* — David E Hamaoui
(74) *Attorney, Agent, or Firm* — Crowell & Moring LLP (57) ABSTRACT

A method and test device for recognizing detecting whether a mass air flow meter of intake air of an internal combustion engine is defective is provided. In the method and device, a test procedure is executed using a pilot controller while a mixture controller that is used in non-test engine operation is deactivated. The pilot controller for the mixture of fuel and air in the respective cylinders outputs control values which, during normal operation of the internal combustion engine via the mixture control, are varied on the basis of a mixture deviation of the current mixture from a stoichiometric mixture. The engine is set to one or more different idling speeds and at each respective idling speed the mixture deviation is detected. If the detected mixture deviation(s) (i'1A.) satisfy a predetermined criteria thresholds, the air flow meter is identified as defective.

16 Claims, 5 Drawing Sheets

(51) Int. Cl.
*F02D 41/14* (2006.01)
*F02D 41/30* (2006.01)

(52) U.S. Cl.
CPC ..... *F02D 41/1443* (2013.01); *F02D 41/1454* (2013.01); *F02D 41/18* (2013.01); *F02D 41/182* (2013.01); *F02D 41/187* (2013.01); *F02D 41/30* (2013.01); *G01F 1/68* (2013.01); *G01F 25/0007* (2013.01); *G01F 25/0053* (2013.01); *Y02T 10/47* (2013.01)

(58) Field of Classification Search
CPC .. F02D 41/144; F02D 41/182; F02D 41/0052; F02D 41/18; G01F 25/0053; G01F 1/68; G01F 25/0007; Y02T 10/47
See application file for complete search history.

(56) References Cited

U.S. PATENT DOCUMENTS

| | | | |
|---|---|---|---|
| 7,578,288 B2 * | 8/2009 | Thiel | F02D 41/1402 123/688 |
| 7,614,392 B2 * | 11/2009 | Fukagai | F02D 41/1456 123/481 |
| 2005/0096835 A1 | 5/2005 | Piwonka et al. | |
| 2007/0199553 A1 | 8/2007 | Thiel et al. | |

FOREIGN PATENT DOCUMENTS

| | | |
|---|---|---|
| DE | 10 2005 006 362 A1 | 8/2006 |
| DE | 10 2005 042 690 A1 | 3/2007 |
| DE | 10 2006 007 698 A1 | 8/2007 |
| WO | WO 03/056161 A1 | 7/2003 |

OTHER PUBLICATIONS

German Search Report issued in counterpart German Application No. 10 2014 202 668.7 dated Sep. 24, 2014, with partial English translation (ten (10) pages).

Chinese-language Office Action issued in counterpart Chinese Application No. 201580002848.0 dated Mar. 20, 2018 with English translation (nine pages).

* cited by examiner

METHOD FOR RECOGNIZING A DEFECTIVE AIR FLOW SENSOR OF AN INTERNAL COMBUSTION ENGINE

CROSS REFERENCE TO RELATED APPLICATIONS

This application is a continuation of PCT International Application No. PCT/EP2015/050919, filed Jan. 20, 2015, which claims priority under 35 U.S.C. § 119 from German Patent Application No. 10 2014 202 668.7, filed Feb. 13, 2014, the entire disclosures of which are herein expressly incorporated by reference.

BACKGROUND AND SUMMARY OF THE INVENTION

The invention relates to a method for detecting a defective air mass flow meter for detecting the air mass flow of intake air for a number of cylinders of an internal combustion engine, in particular in a motor vehicle.

In internal combustion engines, air mass flow meters are frequently installed in the intake manifold of the engine and measure the air mass flow of the intake air. The detected air mass flow is used here within the scope of the engine control to determine the quantity of fuel which is to be apportioned to the cylinders. Soiling, thermal stresses or wear can result in deviations in the signal of the air mass flow meter, i.e. the air mass flow detected by the air mass flow meter deviates from the actual air mass flow. Such defective air mass flow meters give rise to incorrect apportioning of fuel, which over the long term causes the internal combustion engine to malfunction and results in the outputting of a warning message in the vehicle.

Mixture faults in internal combustion engines can result not only from defective air mass flow meters but also from a variety of other causes. They can, for example, be due to a faulty fuel supply system, to a faulty air supply system or to further faulty sensors. However, the air mass flow meter is often the single trigger of a mixture fault. Owing to the large number of possible causes, it is currently difficult to identify the air mass flow meter as a damaged part. In particular, there is currently no possible way of detecting the defect in an air mass flow meter in the installed state in the vehicle. In addition, there are also no tests for checking uninstalled air mass flow meters which can be carried out easily. In order to overcome mixture faults, a large number of repeated repairs are therefore often necessary, since components are exchanged on suspicion. This leads to increased costs.

The object of the invention is therefore to provide a method and a corresponding engine test device with which defective air mass flow meters can be detected easily and reliably in the entire system of the internal combustion engine without requiring the air mass flow meters present to be uninstalled.

The method according to the invention serves to detect a defective air mass flow meter, and if appropriate also a plurality of defective air mass flow meters, in an internal combustion engine. The air mass flow meter serves here to detect the air mass flow of intake air for a number of cylinders of the internal combustion engine, i.e. for a cylinder bank. The internal combustion engine is preferably the engine in a motor vehicle.

According to the invention, within the scope of a test procedure the internal combustion engine is operated by a pilot controller with a mixture controller deactivated. The pilot controller outputs here, in a manner known per se, actuating values for the mixture of fuel and air in the respective cylinders, i.e. the pilot controller defines in advance suitable values for the quantity of fuel which is to be apportioned. These values of the pilot controller are varied in a manner known per se in the normal operating mode of the internal combustion engine (i.e. not in the operating mode of the test procedure according to the invention) by the (activated) mixture controller on the basis of a mixture deviation of the current mixture from a target mixture, e.g. a stoichiometric mixture. The actuating values which are output by the pilot controller should correspond here as far as possible to the actuating values which are adapted or varied by the mixture controller. The mixture deviation is detected by a measuring device and, in particular, by a lambda probe which is known per se. In particular, the mixture deviation is represented by the lambda value or the deviation of the lambda value from 1. The lambda value here is a sufficiently known variable, wherein a lambda value of 1 represents the stoichiometric mixture. Lambda values above 1 indicate excess air and therefore a "lean" mixture. Lambda values below 1 characterize excess fuel and therefore a "rich" mixture.

In a step a) of the test procedure according to the invention, the internal combustion engine is set to one or more different idling speeds and the mixture deviation is detected for a respective idling speed with the mixture controller deactivated. According to an evaluation in a step b) the air mass flow meter is categorized as defective when the detected mixture deviation or detected mixture deviations satisfy a number of criteria (i.e. at least one criterion), wherein the first criterion from the number of criteria is satisfied when the detected mixture deviation for one of the set idling speeds exceeds a predetermined amount. In particular, the first criterion is satisfied when the detected mixture deviation for the maximum set idling speed exceeds a predetermined amount in the direction of mixtures with excess fuel with respect to the stoichiometric mixture. If the mixture deviation is detected on the basis of lambda values, in this case the measured lambda value undershoots a threshold value of less than 1.

The method according to the invention is based on the realization that defective air mass flow meters can be detected easily by analyzing mixture deviations at different idling speeds. A defective air mass flow meter is understood here to be an air mass flow meter whose measured air mass flows deviate from the actual air mass flows beyond a tolerance region. In other words, a defective air mass flow meter does not have to be completely operationally incapable but rather it is to be considered as defective if it no longer supplies sufficiently accurate measurement values.

In one particularly preferred embodiment, with the method according to the invention the specific fault pattern of an air mass flow meter is detected when the measurement values differ greatly from the actual air mass flows in the case of low air mass flows, and in this context represent, in particular, an excessively high air mass flow. In this case, the criteria described above comprise, in addition to the first criterion, also a second criterion and a third criterion, wherein only when the first, second and third criterion are satisfied is a defective air mass flow meter directly detected. In this case, the second criterion is satisfied when the detected mixture deviation with increasing set idling speeds decreases (requirement of monotony). In addition, the third criterion is satisfied when the difference in terms of absolute value between the mixture deviation when a minimum idling speed is set and that when a maximum idling speed is set exceeds a predefined amount.

As already mentioned above, the detected mixture deviation is preferably represented by a deviation of the lambda value from 1, wherein the lambda value is, in particular, a mean value of a plurality of lambda values, measured in a steady-state measuring interval, for the respective set idling speed. A steady-state measuring interval is defined here by the fact that the operating parameters of the internal combustion engine have only small fluctuations (i.e. fluctuations within corresponding tolerance ranges) in the measuring interval.

If the mixture deviation is represented by the deviation of the lambda value, the first criterion and/or second criterion and/or third criterion are preferably defined in such a way that:
 the first criterion is satisfied when the lambda value with the maximum set idling speed deviates from 1 by more than a predefined threshold value, and this lambda value is also preferably less than 1;
 and/or
 the second criterion is satisfied when the lambda value with increasing set idling speed values becomes larger and in this case is preferably never above 1;
 and/or
 the third criterion is satisfied when the difference in terms of absolute value between lambda values with the minimum set idling speed and the maximum set idling speed exceeds a predefined difference value.

The threshold value just defined for the first criterion is preferably between 0.08 and 0.2, in particular is 0.115. The predefined difference value just defined for the third criterion is preferably between 0.03 and 0.1, in particular is 0.06.

In a further preferred embodiment the preset idling speeds comprise one or more of the following idling speed values:
 an idling speed value between 800 and 900 rpm (rpm=revolutions per minute), in particular of 850 rpm;
 an idling speed value between 1000 and 1100 rpm, in particular of 1050 rpm;
 an idling speed value between 1400 and 1600 rpm, in particular of 1500 rpm; and
 an idling speed value between 1900 and 2100 rpm, in particular of 2000 rpm.

In a further preferred variant of the method according to the invention, one or more operating parameters of the internal combustion engine are kept constant for the respective set idling speed. Such operating parameters relate, in particular, to the electric load at the internal combustion engine and/or the control times of valves of the internal combustion engine and/or the coolant temperature of the internal combustion engine. Nevertheless, the operating parameters can also relate to other parameters of the engine. With this variant, the reproducibility of the test according to the invention is ensured.

In a further refinement of the method according to the invention, the actuating values which are output by the pilot controller are adapted by percentage adaptation values for respective operating points of the internal combustion engine with different engine rotational speeds. In other words, the pilot controller comprises what is referred to as a mixture adaptation system, in which the actuating values of the pilot controller are adapted in a suitable way directly in the pilot controller if said values deviate continuously from the actuating values which are subsequently adjusted by the mixture controller. The corresponding adaptation values are stored here in a linking fashion in the pilot controller and as a rule are continuously learnt during the operation of the internal combustion engine. In the case of the use of such a mixture adaptation system, in one preferred variant of the invention before the execution of step a), the adaptation values for different rotational speeds are read out from the pilot controller. After the reading out of the adaptation values, they are preferably reset in the pilot controller, i.e. set to values at which the actuating values of the pilot controller are not adapted. Accordingly, the subsequent engine test is carried out with the original, non-adapted actuating values, as a result of which the reproducibility of the test is ensured. Furthermore, with this approach the test procedure is adapted to the conditions of the engine after delivery, that is to say were adapted in relation to a time at which it was not yet possible to learn any mixture adaptation values.

If read-out adaptation values are present, a number of further criteria are checked if the air mass flow meter is not categorized as defective in the above step b). The number of further criteria comprises here a criterion relating to the adaptation values, wherein in order to satisfy the criterion relating to the adaptation values it is necessary for the minimum adaptation value which is read out to undershoot a predefined first threshold and for the maximum adaptation value which is read out to exceed a predefined second threshold. If the number of further criteria are satisfied, the air mass flow meter which was originally categorized as not defective is now definitively evaluated as defective. When the number of criteria are not satisfied, the air mass flow meter continues to be categorized as intact.

In one particularly preferred embodiment, the criterion relating to the adaptation values is satisfied when the minimum adaptation value which is read out undershoots a predefined first threshold, in particular −13% of the amount of fuel to be injected, and the maximum adaptation value which is read out exceeds a predefined second threshold, in particular +1% of the amount of fuel to be injection, and in addition the rotational speed value of the internal combustion engine in the case of the minimum adaptation value is below a first rotational speed threshold, in particular below 1750 rpm, and the rotational speed value of the internal combustion engine in the case of the maximum adaptation value is above a second rotational speed threshold, in particular above 5250 rpm.

In a further preferred embodiment, when the internal combustion engine is switched off, an idle signal of the air mass flow meter is detected, wherein a variant of such an idle signal is explained in the specific description. The number of further criteria additionally comprises here a criterion relating to the idle signal which is satisfied when the idle signal is outside a standard range. An air mass flow meter is therefore categorized as defective only when both the criterion relating to the adaptation values and the criterion relating to the idle signal are satisfied.

In a further refinement of the method according to the invention, before the start of the test procedure the presence of one or more starting conditions to be satisfied by the internal combustion engine is checked, wherein the test procedure is started only when the starting condition or conditions is/are satisfied. Various variants of such starting conditions can be found, inter alia, in the specific description.

In one particularly preferred embodiment, one or more of the starting conditions are based on fault entries in the fault memory of the control device of the internal combustion engine, wherein a starting condition is preferably configured in such a way that the relative load (a measure of the quantity of air in the cylinder of the internal combustion engine) in the case of the corresponding fault entries is below a threshold value, preferably below 40%. This takes into account the fault pattern described above, according to which the air mass flow meter supplies incorrect air mass flows at low loads (i.e. real low air mass flows) and therefore gives rise to high mixture faults. The term relative load is a customary term for a person skilled in the art and is 100% in the case of induction engines with the throttle valve fully opened and 20% for operating points near to idling. If the engine comprises a turbocharger or some other supercharging method, the relative load can also be above 100%.

In addition to the method described above, the invention also relates to an engine test device for detecting a defective air mass flow meter for detecting the air mass flow of intake air for a number of cylinders of an internal combustion engine. The engine test device is configured to carry out the method according to the invention or one or more preferred variants of the method according to the invention. The engine test device can be an external engine test device here or, if appropriate, can also be integrated into the motor vehicle.

The invention furthermore relates to a motor vehicle with an internal combustion engine and one or more air mass flow meters, wherein the motor vehicle comprises the engine test device described above for testing the air mass flow meter or meters.

Other objects, advantages and novel features of the present invention will become apparent from the following detailed description of one or more preferred embodiments when considered in conjunction with the accompanying drawings.

DETAILED DESCRIPTION OF THE DRAWINGS

An embodiment of the method according to the invention for functionally testing air mass flow meters in an internal combustion engine which has two cylinder banks with 4 cylinders each is explained below, wherein each cylinder bank has a separate air mass flow meter in the intake manifold. In this context, the mixture ratio of fuel to air and therefore the lambda value is measured separately for each cylinder bank by corresponding lambda probes. With the test procedure explained below, it is possible to check the functional capability simultaneously for both air mass flow meters of the respective cylinder banks.

Figure 1:
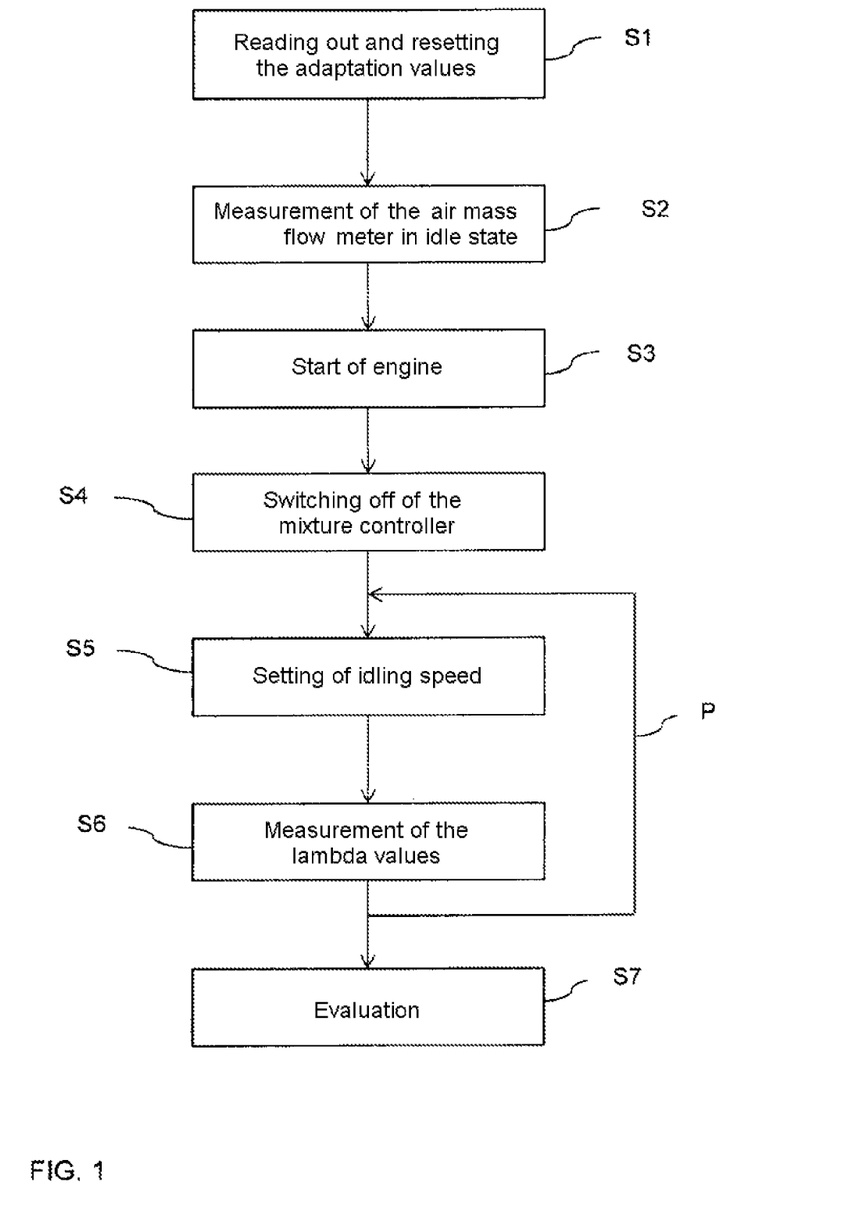
FIG. 1 shows a flowchart of the essential steps of an embodiment of the method according to the invention.

In order to detect defects of the air mass flow meters, the test procedure illustrated in FIG. 1 is carried out. In this context, only the essential steps of the test procedure are represented, wherein further steps which are carried out are dealt with within the scope of the following explanation. The test is carried out with an engine test device in a vehicle workshop. This test device permits the mechanic to diagnose malfunctions of the drive train and therefore provides him with instructions for action via a corresponding user interface in the form of a screen. For this purpose, the engine test device comprises a test module which guides the mechanic step by step through the test by screen interrogations and instructions. The objective here is a rapid test, i.e. an electrical workshop diagnosis which permits self-diagnosis of components of the internal combustion engine using as little manual work as possible. In this context, a high level of reproducibility, small effects on the internal combustion engine and the elimination of fault effects during the troubleshooting are achieved by a high degree of automation.

As already mentioned at the beginning, an air mass flow meter is a measuring device in the intake manifold of the internal combustion engine which measures the air mass flow flowing through it. In the embodiment described here, the air mass flow meter is what is referred to as a hot-film air mass flow meter which detects the air mass flow by the cooling of a heated heating wire and by knowledge of the ambient air temperature. The air mass flow meter is used to detect loads and control loads in spark-ignition engines and to diagnose the air path. Defective air mass flow meters give rise to faulty operating states of the internal combustion engine. The test according to the invention is as a rule carried out when an engine warning lamp lights up in the motor vehicle and the fault memory in the vehicle displays a mixture fault which is caused by continuous deviation of the actuating values, originating from the pilot controller, for the quantity of fuel to be injected from the actuating values which are subsequently adjusted by the mixture controller.

Within the scope of the test procedure of FIG. 1, before the start of the test (not shown as a separate step in FIG. 1), predetermined starting conditions are firstly set. If these starting conditions are not present, the test cannot be started. According to the starting conditions, the ignition of the motor vehicle must be switched on, the engine must be operationally warm and the air mass flow meters must be connected. In addition, the engine must be switched off, a charging device must be connected to the battery of the vehicle and the air-conditioning system compressor of the vehicle must be switched off. The two conditions mentioned last relieve the internal combustion engine of load, in order, to ensure good reproducibility of the test. In addition, the throttle valves are closed in order to exclude external influences during the measurement of the air mass flow meters in the idle state, as further described below.

In order to ensure that a defective air mass flow meter can also be detected from the measurement, before the start of the test as many cross-influences as possible are excluded. These cross-influences are processed using already present test modules and with standard diagnostics. Such cross-influences can be caused by defects in the following components:

Throttle valve actuator, catalytic converter, lambda probe, intake air temperature sensor, intake manifold pressure sensor, fuel quantity control valve, rail pressure sensor, fuel low-pressure sensor, fuel high-pressure pump, injectors, outlet/inlet valve actuators, ignition, fuel tank venting system.

In addition, a leak in the intake path, the suction system, the exhaust manifold, the exhaust system or the crank housing venting system constitutes a cross-influence.

According to step S1 of the test procedure, after the cross-influences have been processed, adaptation values from the pilot controller of the internal combustion engine are firstly read out. The entire pilot control process comprises here a mixture adaptation which detects continuous differences of the actuating values, output by the pilot controller, for the quantity of fuel to be injected, from the actuating values which are subsequently adjusted by the mixture controller, and these deviations are taken into account in the pilot controller by an offset of the actuating value. In other words, the corresponding actuating value of the pilot controller is "learned" iteratively during continuous subsequent adjustment of the mixture within an operating point. A self-regulating improvement of the mixture pilot controller therefore occurs and the dynamic behavior of the internal combustion engine is improved because the mixture controller operates with a delay and in a purely reactive way. For the further test procedure, the adaptation values have to be reset ("zeroed") to the delivery state of the vehicle. Accordingly, at the end of step S1 the adaptation values are deleted from the pilot controller or reset so that the pilot controller outputs its original actuating values and therefore reproducible conditions are present in the following test. The adaptation values which are obtained according to step S1 specify the corresponding adaptation value for the actuating value in the pilot controller as a function of the parameters of the engine load and engine speed as well as for 100° C. coolant temperature, wherein this adaptation value is a percentage correction factor for the actuating value and therefore for the quantity of fuel which is injected.

After the adaptation values have been read out and reset, in the next step S2 a measurement of the respective air mass flow meters in the idle state is carried out. During this measurement in the idle state, the measurement signal of the air mass flow meter is detected as a reference with the engine switched off, i.e. with an air mass flow of zero. In the embodiment described here, this idle signal is represented by a PWM value which represents an average time period in the PWM signal of the heater which is used for the internal control of the air mass flow meter. The PWM value therefore correlates with the time period in a PWM period during which electrical power is fed to the heating wire via the heater. The air mass flow can be derived from this time period. In the case of measurement in the idle state, a tolerance range or standard range, which is between 527 μs and 529 μs for the air mass flow meter considered here, is predefined for the PWM value. As described further below, the measurement in the idle state of the air mass flow meters can be used in certain cases to detect a defect of an air mass flow meter.

After the measurement of the air mass flow meter in the idle state, the engine is started in step S3. In addition, an exhaust gas suction system is connected to the exhaust of the vehicle. After the engine starts, in step S4 the mixture controller of the engine is switched off, with the result that the mixture is only set on the basis of the actuating value of the pilot controller. The generator which is installed in the motor vehicle is subsequently powered down in order to relieve the internal combustion engine of load and therefore to ensure good reproducibility of the test, and the tank venting valve is subsequently closed, which eliminates the cross-influence of fuel vapors on the mixture quality in the test. The process then waits for a predefined time (for example 70 seconds).

In step S5, a first idling speed of the internal combustion engine is set, said idling speed being approximately 850 rpm in the exemplary embodiment described here. The process then waits again for a predetermined time (for example 30 seconds) in order to ensure that an operating point with a stable lambda value exists. In step S6, a plurality of lambda values of the mixture of the respective cylinder banks (for example 15 lambda values) are finally measured with the corresponding lambda probe. The lambda values are then averaged and this mean value represents the lambda value which is detected for the corresponding idling speed.

The steps S5 and S6 are subsequently repeated several times, as indicated by the arrow P in FIG. 1. In particular, the idling speed is increased repeatedly in succession and subsequently a new lambda value is detected for the new idling speed. In the embodiment described here, in addition to the idling speed of 850 rpm, corresponding (averaged) lambda values for idling speeds of 1050 rpm, 1500 rpm and 2000 rpm are detected. During the respective detection of the lambda values, it is also ensured that the control times of the valves are retained in order to exclude influences on the lambda value from variable valve control times. As for the first rotational speed value of 850 rpm, the process also always waits for a predefined time before the measurement of the lambda values for the further higher rotational speed values, in order to ensure a stable operating point of the internal combustion engine with a constant lambda value.

After the detection of the lambda values for the different idling speeds, the actual test procedure is ended and the internal combustion engine is reset again to its normal operating state. That is to say the mixture controller is switched on again, the idling speed is reset to the normal value, the powering down of the tank venting valve is reset, the powering down of the generator is ended, the valve control times are no longer retained and the air conditioning system compressor is actuated again.

In the following step S7, the test is evaluated, which is described in more detail with reference to FIG. 2. For this evaluation, the engine no longer needs to be running. In the scenario considered here, the fault pattern of contaminated air mass flow meters is to be detected. In such air mass flow meters, in the case of low air mass flows an excessively high mass flow is detected as the actual mass flow. This is due to the fact that in the case of low air mass flows the poor transfer of heat of the contaminated air mass flow meter between the gas flow and the heating wire predominates. In contrast, in the case of medium and high air mass flows a contaminated air mass flow meter exhibits signal deviation between the actual mass flow and the detected mass flow which is lower or in the tolerance range. In addition, in the case of very high air mass flows the signal deviation is certainly such that an excessively low mass flow compared to the actual mass flow is detected.

In one preferred variant, before the test starts, the fault memory of the control device of the internal combustion engine is also read out. If it becomes apparent here that the relative loads at which the fault entries have taken place are above 40%, the test is not started. This is due to the fact that in the case of fault entries with low relative loads (and therefore low air mass flows) the fault pattern described above of a contaminated air mass flow meter can be present, and this can be detected according to the embodiment described here. The determination of the relative load for corresponding operating points of the motor vehicle is known to a person skilled in the art and is therefore not described in more detail.

Figure 2:
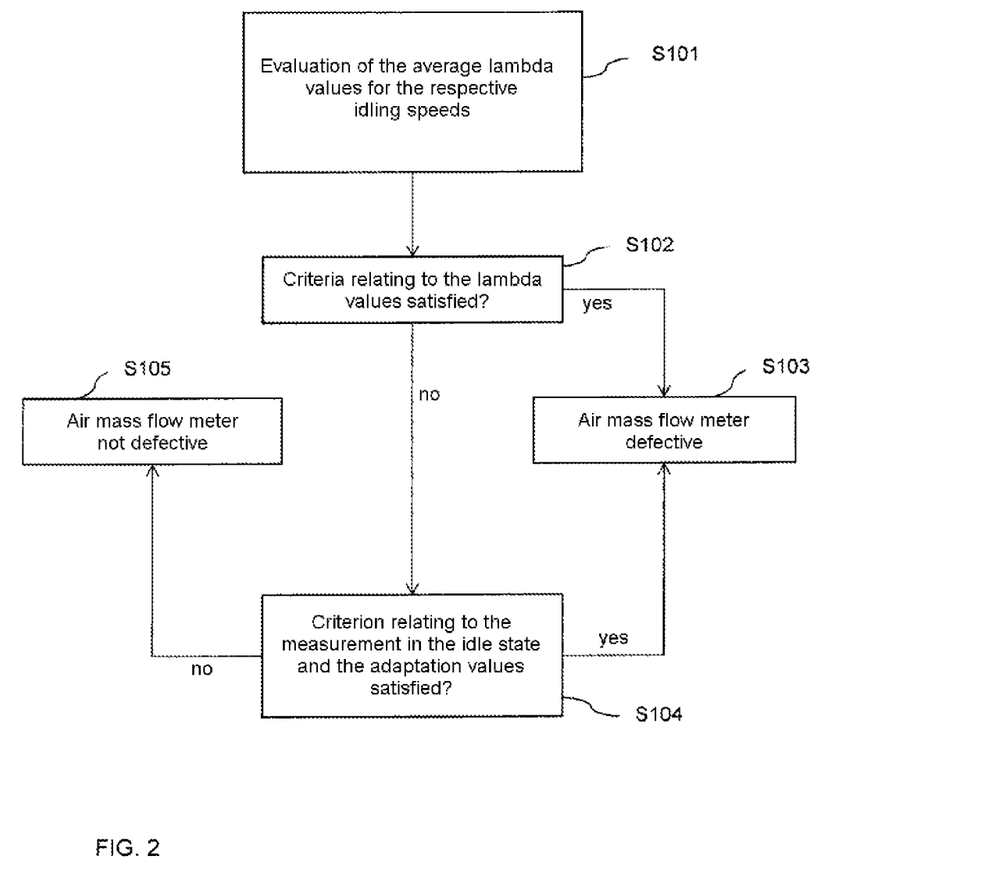
FIG. 2 shows a flowchart which represents the sequence of an evaluation according to an embodiment of the method according to the invention.

According to FIG. 2, in step S101 the average lambda values are evaluated by a corresponding evaluation logic. In this context, the satisfaction of three criteria is checked, wherein the conditions for the satisfaction of the criteria are as follows:

(1−λ(LD)) decreases with increasing idling speed values (i.e. the values are strictly monotonously falling);

$$(1-\lambda(LDmin))-(1-(LDmax))>0.06;$$

$$(1-\lambda(LDMax))>0.115.$$

Here, λ(LD) denotes the average lambda value at a corresponding idling speed LD for which the (average) lambda value was detected. LDmax corresponds to the maximum value of the idling speed, and LDmin corresponds to the minimum value of the idling speed at which the measurements were carried out.

If the abovementioned criteria are satisfied, this corresponds to the fault pattern described above, in which at low rotational speeds an excessively large air mass flow through the air mass flow meter is detected with the consequence of a mixture which is set to too rich a setting. If it therefore becomes apparent in step S102 in FIG. 2 that the specified criteria are satisfied, the corresponding air mass flow meter is categorized as defective, as is clarified by step S103.

Figure 3:
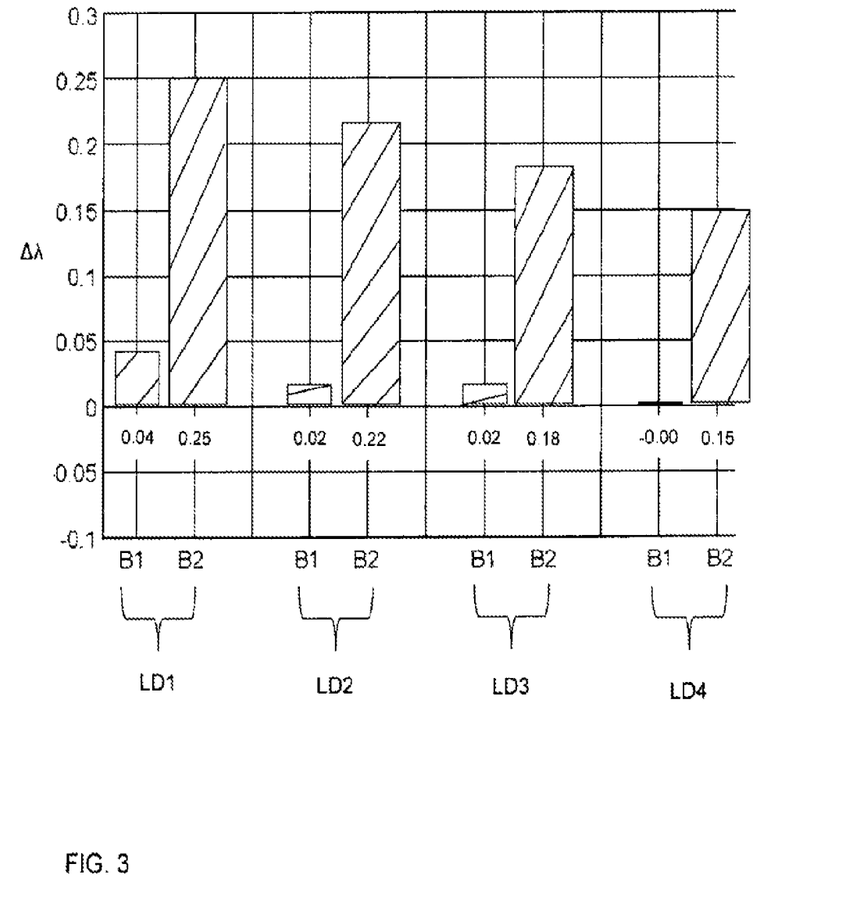
FIG. 3 shows a diagram which represents by way of example mixture deviations which have been determined according to an embodiment of the invention for an internal combustion engine.

In the diagram in FIG. 3, possible average lambda values for the different idling speeds LD1, LD2, LD3 and LD4 are represented by way of example for an engine with the two cylinder banks B1 and B2. LD1 here corresponds to the lowest idling speed of 850 rpm, LD2 to the idling speed of 1050 rpm, LD3 to the idling speed of 1500 rpm and LD4 to the idling speed of 2000 rpm. The deviation Δλ=1−λ(LD) is specified here along the ordinate. This deviation is represented by vertical bars and assigned numerical values for the corresponding rotational speed values and cylinder banks. Relatively high bars correspond to a relatively low lambda value and therefore to a mixture which is set to an excessively rich setting. As is apparent from FIG. 3, the air mass flow meter of the cylinder bank B2 satisfies the abovementioned criteria, while these criteria are not satisfied by the air mass flow meter of the cylinder bank B1. The air mass flow meter of the bank B2 is therefore detected as being defective, and the air mass flow meter of the bank B1 is diagnosed with this criterion alone as "provisionally intact".

If it is detected in step S102 of FIG. 2 that the corresponding lambda criteria for a defect are not satisfied, in a subsequent step S104 criteria relating to the measurement in the idle state as described above and criteria relating to the adaptation values which are read out within the scope of the test procedure are checked. With respect to the adaptation values which are read out, two criteria are checked. These criteria are satisfied under the following conditions:

the minimum adaptation value is less than −13%, and this minimum adaptation value occurs at an engine speed of less than 1750 rpm; and the maximum adaptation value is greater than +1% and occurs at an engine speed of more than 5250 rpm.

The boundaries for the adaptation values and rotational speed values which are specified in the above criteria are by way of example and can deviate therefrom within certain limits depending on the configuration of the method.

Figure 4:
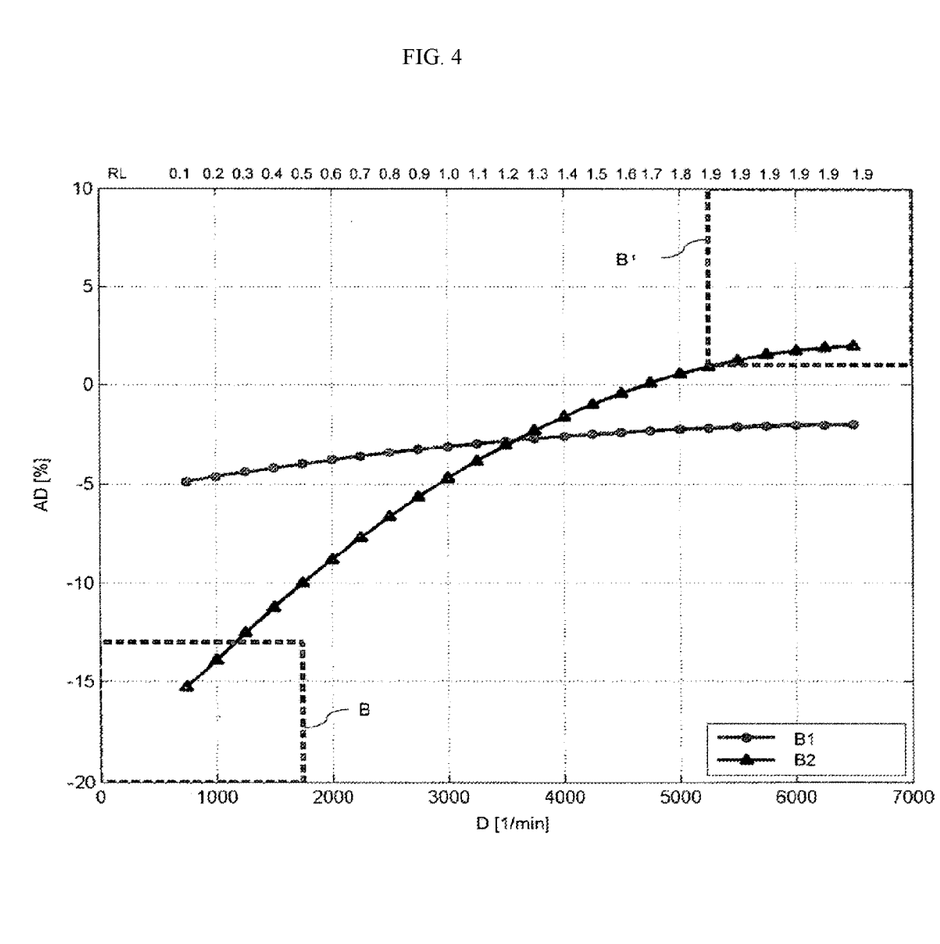
FIG. 4 shows a diagram which shows by way of example the dependencies, read out from a memory in the motor vehicle, between the engine speed of an internal combustion engine and an adaptation value for adapting the pilot controller.

For the sake of clarification, a possible profile of the percentage adaptation values AD is represented in FIG. 4 as a function of the engine speed D for the two cylinder banks B1 and B2. Each adaptation value applies here to a corresponding engine speed which is correlated with a relative engine load RL, which is indicated above the illustrated diagram. The adaptation values apply to a coolant temperature of 100° C.

In the diagram of FIG. 4, the range of rotational speed values and adaptation values which corresponds to the abovementioned first criterion for the adaptation values is represented by the block B. According to the above, the range B' denotes a range of rotational speed values and adaptation values which corresponds to the abovementioned second criterion for the adaptation values. As is apparent from FIG. 4, the adaptation values of the cylinder bank B2 satisfy the abovementioned criteria, whereas the criteria for the cylinder bank B1 are not satisfied.

Figure 5:
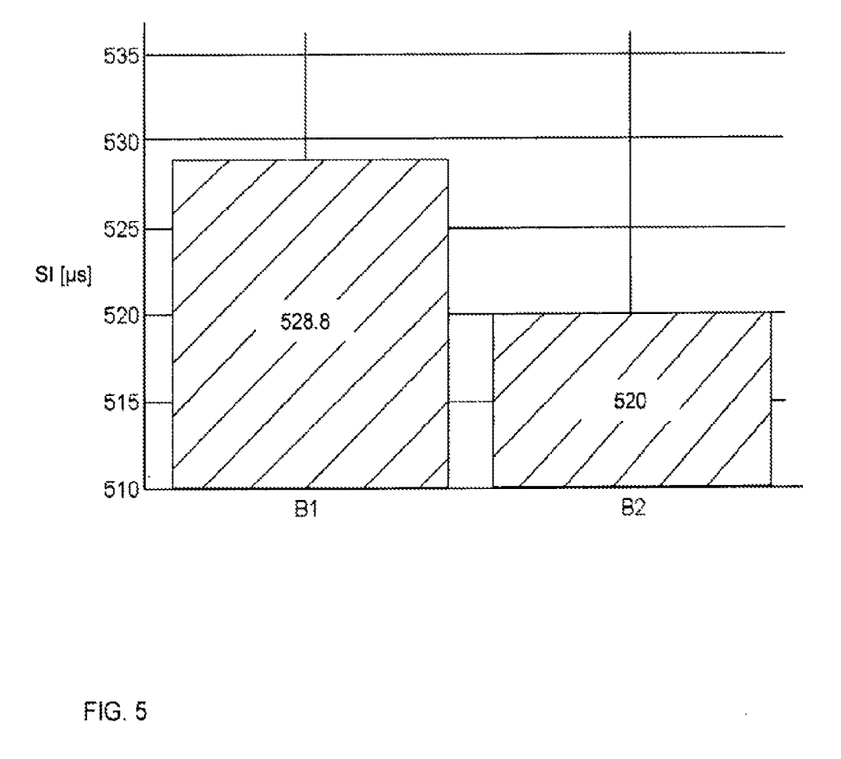
FIG. 5 shows a diagram which represents by way of example the idle signals of two air mass flow meters, which idle signals have been determined in an embodiment of the method according to the invention for an internal combustion engine.

In addition, a criterion is checked with respect to the measurement of the air mass flow meters in the idle state. As already described above, it is checked here whether the corresponding PWM value is in a predefined standard range. This is clarified once more with respect to FIG. 5. In this figure, the PWM value in the form of the idle signal SI is represented for the respective cylinder banks B1 and B2 by means of corresponding bars. Said value is 528.8 μs for the cylinder bank B1, and 520 μs for the cylinder bank B2. The standard range is represented by the interval between 527 μs and 529 μs. According to FIG. 5, the air mass flow meter of the cylinder bank B2 lies outside the standard range. In this context, a criterion relating to the measurement in the idle state of the corresponding air mass flow meter is satisfied when the idle signal thereof lies outside the standard range, i.e. in the scenario in FIG. 5 this criterion is satisfied for the air mass flow meter of the cylinder bank B2 and not satisfied for the air mass flow meter of the cylinder bank B1.

For an air mass flow meter which does not satisfy the criteria from step S102 according to FIG. 2, finally the abovementioned criteria relating to the adaptation values and the measurement in the idle state are checked. This air mass flow meter is detected as being defective (step S103) only if these two criteria are satisfied simultaneously. Otherwise, it is determined that the air mass flow meter is not defective (step S105). If the adaptation values and measurements in the idle state for the air mass flow meters are considered in accordance with FIGS. 4 and 5, only the air mass flow meter of the cylinder bank B2 is detected as being defective.

The embodiment of the method according to the invention which is described above has a series of advantages. In particular, selective automatic checking of the air mass flow meters in a motor vehicle is made possible with a simple and rapid test method. The test method is not invasive here and can run in the original state of the engine. It is not necessary to uninstall the air mass flow meters in order to check them. Therefore, in the event of a mixture fault it is possible to detect in a selective way whether an air mass flow meter is responsible for it, without components having to be exchanged on suspicion in this respect. As a result, the number of repeated repairs and therefore the costs for the customer and the vehicle manufacturer are reduced. In addition, the customer satisfaction of the vehicle user is improved by the repair which is then more robust and more rapid.

LIST OF REFERENCE SYMBOLS

S1, S2, . . . , S7 Steps of the test procedure
P Arrow
S101, S102, . . . , S105 Steps of the evaluation
Δλ Mixture deviation
LD1, . . . , LD4 Idling speeds B1, B2 Cylinder banks
AD Adaptation value
D Engine speed
RL Relative load
SI Idle signal The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting whether an air mass flow meter of an internal combustion engine is defective, comprising the acts of:
    outputting, from a pi lot controller configured to control operation of a fuel injection system of the engine in a testing mode, actuating values used to control an amount of fuel injected by the fuel injection system to obtain a target mixture of fuel and air in respective cylinders of the engine, wherein the outputting of actuating values by the pilot controller occurs while a mixture controller is deactivated,
    the mixture controller being configured to control operation of the fuel injection system during a non-testing mode in which the mixture is controlled by adjusting a fuel supply amount on the basis of a mixture deviation from the target mixture provided by the pilot controller, the mixture deviation being measured by an exhaust gas lambda sensor;
    setting using the pilot controller of an idling speed of the engine to at least one idling speed;
    detecting the mixture deviation from the stoichiometric mixture at each of the at least one idling speeds; and
    identifying the air mass flow meter as defective if the detected mixture deviation at the at least one idling speed satisfies at least one predetermined criterion, wherein
        the target mixture is a stoichiometric mixture,
        the at least one predetermined criterion includes a first criterion that is satisfied when the detected mixture deviation for a maximum one of the at least one idling speeds exceeds the stoichiometric mixture by a predetermined amount in a direction of mixtures with excess fuel,
        the at least one idling speed is a plurality of different idling speeds,
        the at least one predetermined criterion includes second and third criteria,
        the second criterion is satisfied when the detected mixture deviation decreases with increasing testing speeds, and
        the third criterion is satisfied when a difference in absolute value between a mixture deviation at a minimum one of the plurality of different idling speeds and a mixture deviation at a maximum one of the plurality of different idling speeds exceeds a predefined amount.

2. The method as claimed in claim 1, wherein the detected mixture deviation is a deviation of a lambda value from 1, and
the lambda value is a mean value of a plurality of lambda values measured in a steady-state measuring interval at each of the plurality of different idling speeds.

3. The method as claimed in claim 2, wherein the air mass flow meter is identified as defective when at least one of
    the first criterion is satisfied when the measured lambda value at the maximum one of the plurality of idling speeds is less than 1 by more than a predefined threshold value, and
    the second criterion is satisfied when the measured lambda value with the increasing different idling speeds is below 1 and increases with the increasing different idling speeds, and
    the third criterion is satisfied when the difference in absolute value between the mixture deviation at the minimum one of the plurality of different idling speeds and the mixture deviation at the maximum one of the plurality of different idling speeds exceeds a predefined difference value.

4. The method as claimed in claim 3, wherein the predefined threshold value is between 0.08 and 0.2.

5. The method as claimed in claim 3, wherein the predefined difference value is between 0.03 and 0.1.

6. The method as claimed in claim 3, wherein the plurality of different idling speeds includes at least one of an idling speed value between 800 and 900 rpm, 1000 and 1100 rpm, 1400 and 1600 rpm and 1900 and 2100 rpm.

7. The method as claimed in claim 3, wherein at least one operating parameter of the engine is kept constant in the testing mode at each of the plurality of different idling speeds, and
the at least one operating parameter of the engine includes at least one of an electric load on the engine, control times of engine valves and an engine coolant temperature.

8. The method as claimed in claim 1, wherein the pilot controller is configured to adapt the actuating values by percentage adaptation values corresponding to respective operating points of the internal combustion engine at each of the at least one idling speed, further comprising the acts of:
    before the act of outputting the testing mode actuating values, resetting previous adaptation values in the pilot controller to baseline values;
    after the act of identifying whether the air mass flow meter is defective, if the air mass flow meter is not identified as defective, comparing adaptation values generated during the testing mode to at least one adaptation value criterion; and
    identifying the air mass flow meter as defective if a minimum one of the generated adaptation values is less than a predefined first adaptation value threshold and a maximum one of the generated adaptation values is greater than a predefined second adaptation value threshold.

9. The method as claimed in claim 8, wherein the first adaptation value threshold is 13%;
the second adaptation value threshold is 1%,
a rotational speed value of the engine when the minimum adaptation value is less than the first adaptation value threshold is less than 1750 rpm, and
the rotational speed value of the engine when the maximum adaptation value is above the second adaptation value threshold is greater than 5250 rpm.

10. The method as claimed in claim 9, wherein the air mass flow meter is identified as defective if the engine is in a switched off state and an idle signal of the air mass flow meter is outside a predetermined idle signal standard range.

11. The method as claimed in claim 1, further comprising the act of:
   before the outputting act, determining whether at least one prerequisite engine condition for entering the testing mode is satisfied, and inhibiting entering the testing mode if the at least one prerequisite engine condition is not satisfied.

12. The method as claimed in claim 11, wherein
   at least one of the at least one prerequisite engine conditions is based on fault entries in a fault memory of a control device of the engine.

13. The method as claimed in claim 12, wherein
   at least one of the at least one prerequisite engine conditions is an engine relative load being less than a predetermined relative load threshold value.

14. The method as claimed in claim 13, wherein
   the predetermined relative load threshold value is 40%.

15. An engine test device for detecting whether an air mass flow meter of an internal combustion engine is defective, comprising:
   a mixture controller configured to control operation of a fuel injection system of the engine during a non-testing mode in which a mixture of fuel and air is controlled by adjusting a fuel supply amount on the basis of a mixture deviation from a stoichiometric mixture measured by an exhaust gas lambda sensor;
   a pilot controller configured to control operation of the fuel injection system of the engine in a testing mode when the mixture controller is deactivated, the pilot controller being configured to output actuating values to control an amount of fuel injected by the fuel injection system to obtain a target mixture of fuel and air in respective cylinders of the engine; and
   an air mass flow meter configured to measure a mass flow of air entering the engine and
   wherein the engine test device is configured to
      set using the pilot controller an idling speed of the engine to at least one idling speed;
      detect the mixture deviation from the stoichiometric mixture at each of the at least one idling speeds; and
      identify the air mass flow meter as defective if the detected mixture deviation at the at least one idling speed satisfies at least one predetermined criterion,
   wherein
      the at least one predetermined criterion includes a first criterion that is satisfied when the detected mixture deviation for a maximum one of the at least one idling speeds exceeds the stoichiometric mixture by a predetermined amount in a direction of mixtures with excess fuel,
      the at least one idling speed is a plurality of different idling speeds,
      the at least one predetermined criterion includes second and third criteria,
      the second criterion is satisfied when the detected mixture deviation decreases with increasing testing speeds, and
      the third criterion is satisfied when a difference in absolute value between a mixture deviation at a minimum one of the plurality of different idling speeds and a mixture deviation at a maximum one of the plurality of different idling speeds exceeds a predefined amount.

16. A motor vehicle having an internal combustion engine and an engine test device configured to detect whether an air mass flow meter of a n internal combustion engine is defective, comprising:
   a vehicle structure supporting the engine;
   a pilot controller;
   a mixture controller configured to control operation of a fuel injection system of the engine during a non-testing mode in which a mixture of fuel and air is controlled by adjusting a fuel supply amount on the basis of a mixture deviation from a target mixture provided by the pilot controller, the mixture deviation being measured by an exhaust gas lambda sensor; and
   an air mass flow meter configured to measure a mass flow of air entering the engine,
   wherein the pilot controller is configured to control operation of the fuel injection system of the engine in a testing mode when the mixture controller is deactivated, and being configured to output actuating values to control an amount of fuel injected by the fuel injection system to obtain a target mixture of fuel and air in respective cylinders of the engine,
   wherein the engine test device is configured to
      set using the pilot controller an idling speed of the engine to at least one idling speed;
      detect the mixture deviation from the stoichiometric mixture at each of the at least one idling speeds; and
      identify the air mass flow meter as defective if the detected mixture deviation at the at least one idling speed satisfies at least one predetermined criterion, and
   wherein
      the target mixture is a stoichiometric mixture,
      the at least one predetermined criterion includes a first criterion that is satisfied when the detected mixture deviation for a maximum one of the at least one idling speeds exceeds the stoichiometric mixture by a predetermined amount in a direction of mixtures with excess fuel,
      the at least one idling speed is a plurality of different idling speeds,
      the at least one predetermined criterion includes second and third criteria,
      the second criterion is satisfied when the detected mixture deviation decreases with increasing testing speeds, and
      the third criterion is satisfied when a difference in absolute value between a mixture deviation at a minimum one of the plurality of different idling speeds and a mixture deviation at a maximum one of the plurality of different idling speeds exceeds a predefined amount.

* * * * *